Figure 1:
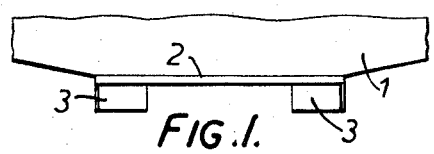

United States Patent [19]

Smith

[11] 3,789,627
[45] Feb. 5, 1974

[54] ROTARY COUPLINGS
[75] Inventor: John Cambridge Smith, Cheltenham, England
[73] Assignee: Hydro-Mite Limited, Cheltenham, England
[22] Filed: Oct. 6, 1971
[21] Appl. No.: 187,123

[52] U.S. Cl. .................................. 64/31, 64/16
[51] Int. Cl. ............................................. F16d 3/04
[58] Field of Search .................................. 64/31, 16

[56] References Cited
UNITED STATES PATENTS

| | | | |
|---|---|---|---|
| 3,338,585 | 8/1967 | Poorman | 64/31 |
| 1,488,497 | 4/1924 | Higgins | 64/31 |
| 2,220,799 | 11/1940 | Edwards | 64/31 |
| 1,352,953 | 9/1920 | Grundy | 64/31 |
| 2,433,791 | 12/1947 | Smith | 64/31 |

*Primary Examiner*—Manuel A. Antonakas
*Assistant Examiner*—Randall Heald
*Attorney, Agent, or Firm*—William D. Hall et al.

[57] ABSTRACT

A rotary shaft coupling of the so called Oldham coupling type including a flat metal coupling disc with grooves or slots on two perpendicular transverse axes to engage respectively with teeth or dogs attached to drive discs or flanges attached to the two drive shafts. Two surfaces of the slots or grooves on the coupling disc lie in a common transverse plane to avoid tilting moments on the disc and the disc is formed by a simple punching or stamping operation.

3 Claims, 7 Drawing Figures

ROTARY COUPLINGS

This invention relates to so-called Oldham couplings in which a coupling element is interposed between two rotary drive members, the element having a connection with each drive member which will permit relative sliding movement on a transverse axis, i.e., transverse to the rotary axis of the drive member, the two transverse axes being approximately perpendicular. Such couplings will accommodate limited misalignment between the axes of the drive members. It is an object of the present invention to provide an improved Oldham coupling which will be simple and economical to manufacture and assemble, stable in operation, and capable of transmitting comparatively large torsional loads within specific size limitations.

In conventional Oldham couplings the coupling element has ribs formed on opposite faces extending diametrically across the disc and angularly displaced at 90°. A coupling of this type has certain disadvantages owing to the fact that the abutment surfaces on the two ribs are displaced axially so that a certain tilting moment is applied and the coupling can become unstable. Furthermore although the design of the coupling element is simple its production can be relatively expensive involving removal of considerable amounts of metal by machining operations.

According to the present invention there is provided a rotary shaft coupling assembly comprising a first drive flange secured to a first shaft, and formed integral with a diametral drive rib on the face of said flange remote from said shaft, said rib being of uniform solid rectangular cross-section, a second drive flange secured to a second shaft approximately coaxial with said first shaft, said second drive flange having a pair of spaced drive lugs integral with said flange and extending from the face of said second flange remote from said second shaft, said two drive lugs being approximately square as seen along the direction of the axis of said second shaft, and positioned in line on a common diameter of said flange, and of uniform solid rectangular cross section as viewed along said diameter, and an intermediate coupling member in the form of a circular flat metal plate which constitutes the sole connection between said first and second drive flanges and has one double-ended diametral slot with closed ends, of a length greater than the length of said diametral drive rib, and two separate spaced radially extending single-ended slots on a diameter perpendicular to said diametral slot, the inner ends of said single-ended radial slots being closer to the central axis of said intermediate coupling member than the outer ends of said double-ended slot, said diametral and radial slots being dimensioned to receive and accommodate said drive rib and drive lugs respectively on said first and second drive flanges, and to permit limited sliding movement thereof on two transverse mutually perpendicular axes, said diametral and radial slots having lateral flank surfaces lying entirely within the common radial plane of said intermediate coupling member, and said coupling member being formed as a punched plate.

Figure 3:
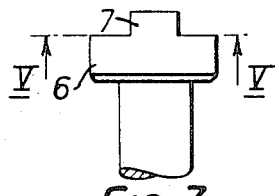
Figure 2:
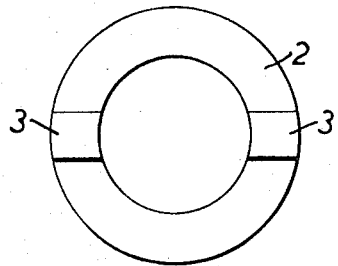
Figure 4:
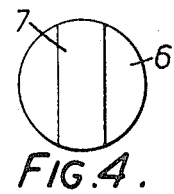
Figure 5:
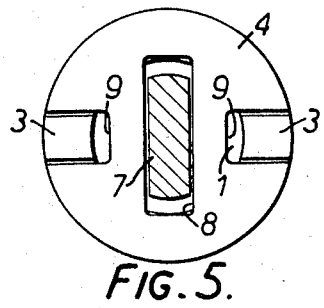
Figure 6:
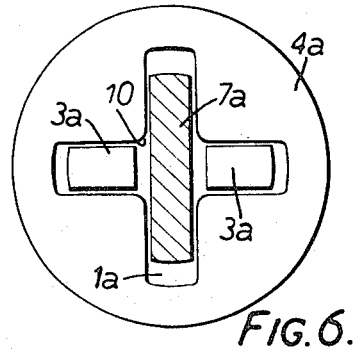
Figure 7:
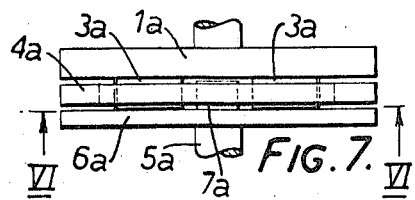

The invention may be performed in various ways and some specific embodiments will now be described by way of example, with reference to the accompanying drawings: in which FIG. 1 is a side view of the end of a first drive member to be coupled to another by an Oldham coupling according to the invention, FIG. 2 is an end view of the member of FIG. 1, FIG. 3 is a side view of a second drive member to be coupled to the first drive member, FIG. 4 is an end view of the member of FIG. 3, FIG. 5 is a radial section of the Oldham coupling, equivalent to the line V—V of FIG. 3, FIG. 6 is a radial section of another form of Oldham coupling according to the invention, being a section on the line VI—VI of FIG. 7, and FIG. 7 is a side view of the coupling of FIG. 6.

The Oldham-type couplings to be described are for connecting two drive members or shafts on approximately parallel aligned axes. Each coupling will however accommodate limited linear and angular misalignment between the shafts while rotating and transmitting torque. The coupling may be incorporated into the rotary drive of a machine such as a rotary hydraulic pump or motor.

Referring to FIGS. 1 to 5, the end of a first shaft (not shown) has a circular drive flange 1, the end face of which has a concentric shallow annular formation 2 with two diametrically opposed lugs 3 of approximately square cross-section, which constitute means for connection to an intermediate coupling element 4 (FIG. 5). A second shaft 5 (FIG. 3) also has a circular drive flange 6 the end face of which has a transverse diametral rib 7 of approximately square cross-section, forming means for connection to the coupling element 4. The transverse rib 7 is shorter than the internal diameter of the formation 2, which is the same as the distance between the two lugs 3.

The intermediate coupling element 4 is a simple flat circular metal disc having a slot 8 extending diametrically on a first transverse axis across the centre of the disc but terminating short of the periphery at each end. This slot is dimensioned to receive the diametral rib 7 on the drive flange 6 and its length is such that a limited degree of endwise sliding movement can be obtained on this first transverse axis.

The coupling disc 4 also has a pair of aligned slots 9 extending radially inwards from diametrically opposite points on the periphery, on a second transverse axis perpendicular to the first transverse axis. The positions and dimensions of these peripheral slots 9 are such that they will engage the two spaced lugs 3 on the drive flange 1 and again permit limited relative sliding movement on this second transverse axis.

The intermediate coupling disc 4 is located between the two drive flanges 1 and 6, which are held apart axially by bearings (not shown) so that the coupling disc is at all times free to move transversely and compensate for misalignment of the shafts. There is no structure other than the disc interconnecting the drive flanges 1 and 6, and no other structure locating the disc 4, which is therefore free floating to move transversely on the two mutually perpendicular axes while the coupling is rotating and torque is being transmitted.

It will be noted that the abutment surfaces formed by the flanks or edges of the slots 8 and 9 are in a common plane so that tilting moments are eliminated or minimised. The coupling disc is simply stamped or punched in one operation from a suitable sheet metal blank and is thus inexpensive to manufacture and provides for the transmission of considerable torques.

A number of modifications are possible. For example in FIGS. 6 and 7 the intermediate coupling disc 4a is formed with two intersecting slots providing a "cross" 10. In other respects this embodiment is similar to that described above.

I claim:

1. A rotary shaft coupling assembly comprising a first drive flange secured to a first shaft, and formed integral with a diametral drive rib on the face of said flange remote from said shaft, said rib being of uniform solid rectangular cross-section, a second drive flange secured to a second shaft approximately coaxial with said first shaft, said second drive flange having a pair of spaced drive lugs integral with said flange and extending from the face of said second flange remote from said second shaft, said two drive lugs being approximately square as seen along the direction of the axis of said second shaft, and positioned in line on a common diameter of said flange, and of uniform solid rectangular cross-section as viewed along said diameter, and an intermediate coupling member in the form of a floating circular flat metal plate which constitutes the sole connection between said first and second drive flanges and has one double-ended diametral slot with closed ends, of a length greater than the length of said diametral drive rib, and two separate spaced radially extending single-ended slots on a diameter perpendicular to said diametral slot, the inner ends of said single-ended radial slots being closer to the central axis of said intermediate coupling member than the outer ends of said double-ended slot, said diametral and radial slots being dimensioned to receive and accommodate said drive rib and drive lugs respectively on said first and second drive flanges, and to permit limited sliding movement thereof on two transverse mutually perpendicular axes while said coupling assembly is rotating and torque is being transmitted between said drive flanges, said diametral and radial slots having lateral flank surfaces lying entirely within the common radial plane of said intermediate coupling member, and said coupling member being formed as a punched plate.

2. A shaft coupling according to claim 1, wherein said two single-ended slots in said intermediate coupling member open into the external periphery of said member.

3. A shaft coupling according to claim 1, wherein said two single-ended slots in said intermediate coupling member open into said diametral slot therein, forming a cross-shaped aperture.

* * * * *